United States Patent [19]
Centofanti

[11] 3,957,235
[45] May 18, 1976

[54] ROTATING PARACHUTE

[76] Inventor: Armando P. Centofanti, 2812 Newbern Circle, Youngstown, Ohio 44502

[22] Filed: July 21, 1975

[21] Appl. No.: 597,897

Related U.S. Application Data

[63] Continuation-in-part of Ser. No. 472,895, May 23, 1974, abandoned.

[52] U.S. Cl. ............................................. 244/152
[51] Int. Cl.² ........................................ B64D 17/34
[58] Field of Search ............ 244/138 R, 138 A, 141, 244/142, 145, 146, 147, 152, 139, 140, 23 C; 46/86

[56] References Cited
UNITED STATES PATENTS

| | | | |
|---|---|---|---|
| 1,537,713 | 5/1925 | Sperry et al. | 244/152 |
| 2,797,885 | 7/1957 | Barish | 244/145 |
| 3,456,902 | 7/1969 | Visconti | 244/23 C |
| 3,633,849 | 1/1972 | Kling | 244/23 C |

FOREIGN PATENTS OR APPLICATIONS

| | | | |
|---|---|---|---|
| 17,855 | 11/1909 | United Kingdom | 244/135 |
| 696,993 | 1/1931 | France | 244/152 |
| 780,754 | 8/1957 | United Kingdom | 244/142 |
| 1,315,832 | 12/1962 | France | 244/152 |

*Primary Examiner*—Trygve M. Blix
*Assistant Examiner*—Galen L. Barefoot
*Attorney, Agent, or Firm*—Webster B. Harpman

[57] ABSTRACT

A rotating parachute has a conventional canopy with a set of shroud lines depending from the peripheral edges thereof and supporting a circular frame in which variable pitch fan blades are radially positioned arranged to convert vertical falling motion to rotary motion which is imparted to the parachute canopy to prevent spilling of the air therefrom.

4 Claims, 3 Drawing Figures

ROTATING PARACHUTE

This is a continuation-in-part of Ser. No. 472,895, filed May 23, 1974, now abandoned.

BACKGROUND OF THE INVENTION

1. Field of the Invention:

This invention relates to parachutes such as used in lowering cargo containers from an aircraft to the ground.

2. Description of the Prior Art:

Prior structures of this type have provided modifications in the parachute canopy as by forming fan shaped panels therein to provide for revolving the same for self stabilization. See for example U.S. Pat. Nos. 2,701,697 and 2,949,266. In addition to these proposals the prior art includes toy devices wherein fan blades and a parachute are secured to a common center shaft with a spring wound mechanism for rotating the fan blades to move the air against the parachute as in U.S. Pat. No. 833,504. U.S. Pat. No. 1,711,122 provides a propeller like fan suspended from a parachute with a swivel connection so that rotary motion imparted the propeller like fan will not rotate the parachute but will move air upwardly into the same.

The present invention provides a parachute canopy with a directly connected rotary fan having variable pitch blades whereby the downward movement of the parachute and fan assembly through the air will cause rotation of the same to a desirable degree controlled by the pitch of the fan blades, etc.

SUMMARY OF THE INVENTION

A rotary parachute comprises a parachute canopy having shroud lines depending from the peripheral edges thereof and directly supporting a circular fan blade assembly, the radial blades of which are arranged for adjustment so as to vary the pitch thereof. A support shaft rotatably engages a hub of said fan blade assembly and the hub incorporates a brake mechanism to provide a desirable control of the rotating parachute with respect to an object supported and being lowered thereby.

DESCRIPTION OF THE PREFERRED EMBODIMENT

Figure 1:
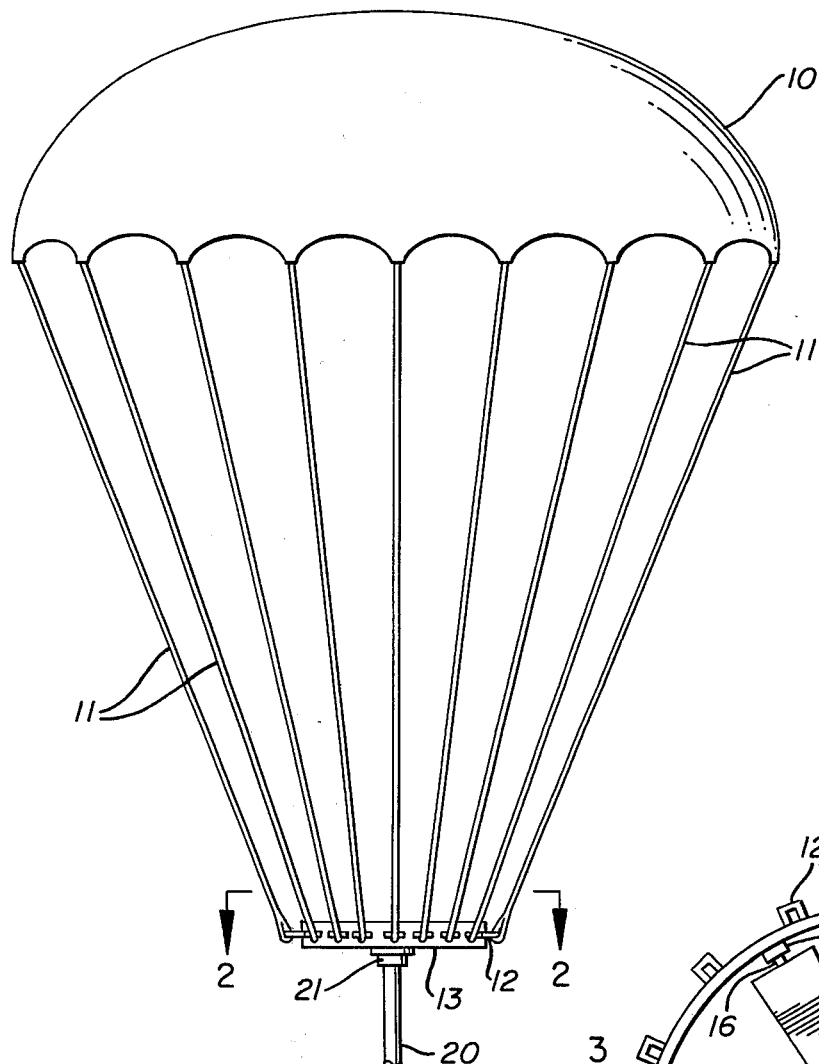
FIG. 1 is a side elevation of the rotary parachute.
Figure 2:
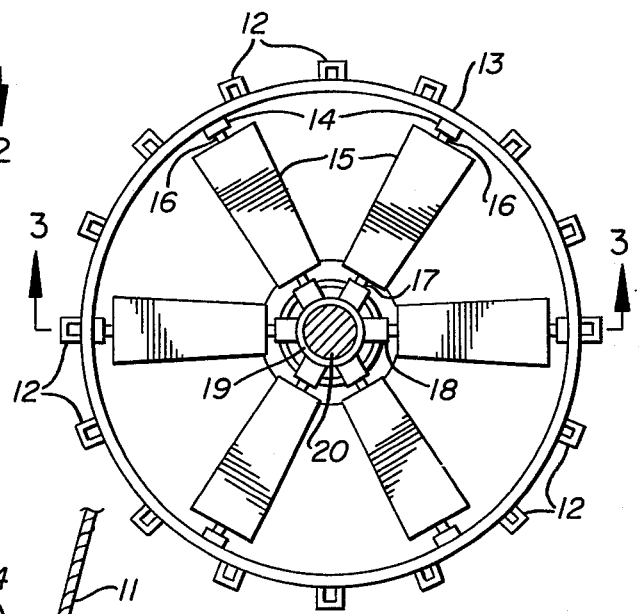
FIG. 2 is an enlarged top plan view on line 2—2 of FIG. 1.
Figure 3:
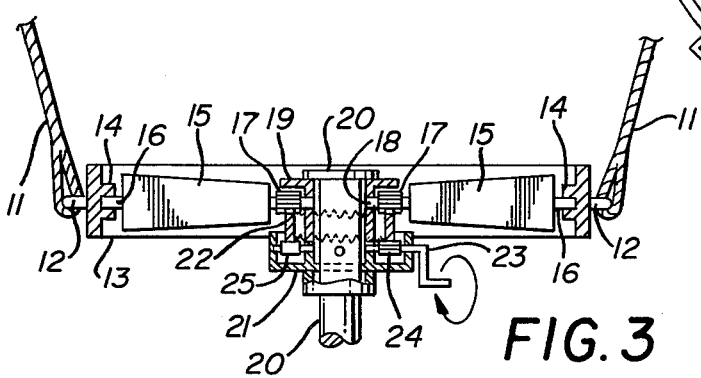
FIG. 3 is a horizontal section on line 3—3 of FIG. 2.

In the form of the invention disclosed herein as seen in FIG. 1, the rotary parachute comprises a canopy 10 of conventional configuration having a plurality of shroud lines 11 secured to the peripheral edges of the canopy 10 and depending therefrom. The lower ends of the shroud lines 11 are secured to eyelets 12 which are circumferentially spaced about an annular frame 13. A plurality of sockets 14 are positioned in circumferentially spaced relation on the inner opposite side of the annular frame 13 and a plurality of adjustable fan blades 15 having projecting shafts 16 engaged in the sockets 14 are disposed in a radial pattern within the annular frame 13. The opposite inner ends of the shafts 16 are provided with gears 17 and are engaged in secondary sockets 18 in a hub 19 which is centrally apertured for the reception of a main support 20 about which the hub 19 revolves. The lower portion of the hub 19 is enlarged as at 21 as best seen in FIGS. 2 and 3 of the drawings to form a housing in which a revolvable ring gear 22 is rotatably positioned so that its uppermost edge and the gear teeth thereof will engage gears 17 on extending shafts 16 of the fan blades 15 and thereby be capable of rotating the same on their axes when the revolvable ring gear 22 is moved relative thereto. Means such as a crank 23 having a spur gear 24 thereon engaged on the revolvable ring gear 22 is journaled in the housing 21 as will be understood by those skilled in the art so that the device for imparting variable pitch to the fan blades 21 may be manually actuated as desired as in presetting the pitch of the blades for a particular load to be borne by the parachute and a desired revolving motion thereof relative to wind velocity, etc.

It will occur to those skilled in the art that if desired a brake mechanism can also be incorporated in the housing 21 for selective engagement with the main support 20 so that the brake mechanism can be preset for example to offer resistence to the rotation of the device and the parachute from which it is suspended.

Those skilled in the art will observe that the rotating parachute herein is particularly useful in controlling the rate of descent and the angle of descent of a parachute under various wind conditions which frequently tend to spill the parachute and adversely affect the desired descent rate.

Although but one embodiment of the present invention has been illustrated and described, it will be apparent to those skilled in the art that various changes and modifications may be made therein without departing from the spirit of the invention.

Having thus described my invention what I claim is:

1. A rotary parachute comprising the combination of a canopy having a set of shroud lines connected at their upper ends with the peripheral edge of the canopy and a device attached to the lower ends of said shroud lines for imparting rotary motion to said shroud lines and canopy, said device comprising an annular frame, a central hub and a plurality of shafts rotatably positioned radially therebetween, fan blades on said shafts so as to rotate said device by air passing upwardly therethrough when said parachute is descending, means on said annular frame and central hub journaling said shafts, gears on said shafts and means for simultaneously rotating said gears and shafts so as to change the pitch of said fan blades and the speed of rotation of said device, the lower ends of said shroud lines being attached to said annular frame and means carried by said central hub of said device for supporting an article to be carried thereby in non-rotative depending relation thereto.

2. The rotary parachute of claim 1 and wherein said means carried by the central hub comprises a main support revolvably positioned through said central hub for supporting an item to be lowered by said rotary parachute.

3. The rotary parachute of claim 1 and wherein means for simultaneously rotating said shafts and fan blades on their longitudinal axes comprises a ring gear rotatably positioned in said hub and engaged on said gears on said shafts and a device for rotating said ring gear.

4. The rotary parachute of claim 3 and wherein said device for rotating said ring gear is a crank and spur gear thereon engaged on said ring gear.

* * * * *